United States Patent Office 2,752,312
Patented June 26, 1956

2,752,312
POLYAMIDE-POLYAMATE-THICKENED GREASE

Joseph A. Dixon, Berkeley, Calif., assignor to California Research Corporation, San Francisco, Calif., a corporation of Delaware No Drawing. Application August 19, 1952,
Serial No. 305,287

7 Claims. (Cl. 252—33.6)

This patent application is directed to new grease-thickening agents for the formation of high temperature grease compositions. Specifically, this patent application is directed to high temperature grease compositions thickened with certain polyamides; that is, polyamides produced from amines and dibasic acids.

It is becoming more and more apparent that, for the most part, greases must be able to lubricate effectively at high temperatures, that is, temperatures in the range of 350° F. to 500° F., preferably above 400° F. Numerous grease specifications of government agencies and industry now specify grease compositions having minimum dropping points of 400° F. This need for high temperature greases is the result of increased driving power, which increases the speeds of gears, bearings, and other moving parts; increased pressures caused by the development of smaller gears to withstand greater loads than heretofore possible with larger gears, etc.

Greases prepared according to the present invention will maintain grease consistencies at extremely high temperatures; that is, such greases will remain unctuous and not become hard or brittle at temperatures in the range of 350° F. to 500° F.

In the automotive industry, for example, there is the constant desire to manufacture smaller internal combustion engines without sacrificing power output. In fact, many of these smaller engines are designed to deliver greater power than their larger counterparts. The same smaller engines have considerably less bearing surfaces than the larger predecessors, which means that the bearings bear greater loads than before.

Similarly, the continuing trend to manufacture automobiles with lower centers of gravity has made it necessary to use smaller driving gears, particularly in such gear assemblies as the differentials and transmissions. The smaller gears thus used have considerably greater pressures exerted upon them per unit area than gears of older type gear assemblies. The higher loads on bearings and gears demand better thickening agents in grease compositions.

According to the present invention, lubricating oils are thickened to the consistency of greases by incorporating certain polyamides therein. These polyamides are prepared by first reacting a dicarboxylic acid with a diamine, wherein the molar ratio of dicarboxylic acid to amine is greater than 1. The resulting polyamido dicarboxylic acid is then further treated with a primary or secondary amine (or mixtures thereof) in an amount less than that necessary to neutralize all of the carboxyl groups, forming polyamic acids. The polyamic acids are then reacted with a metal oxide or hydroxide to neutralize the carboxyl group of the polyamic acid. The polyamic acid metal salt, then, is used to thicken lubricating oils to the consistency of a grease according to this invention.

The reactions involved in the preparation of this thickening agent are exemplified as follows:

EQUATION 1

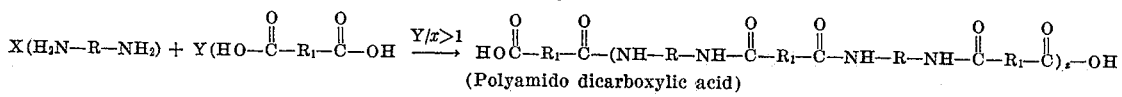

(Polyamido dicarboxylic acid)

EQUATION 2

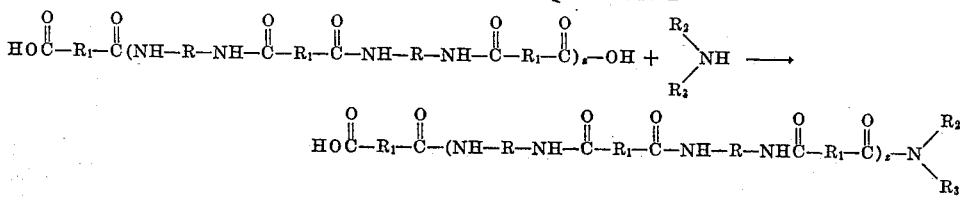

(Polyamic acid)

EQUATION 3

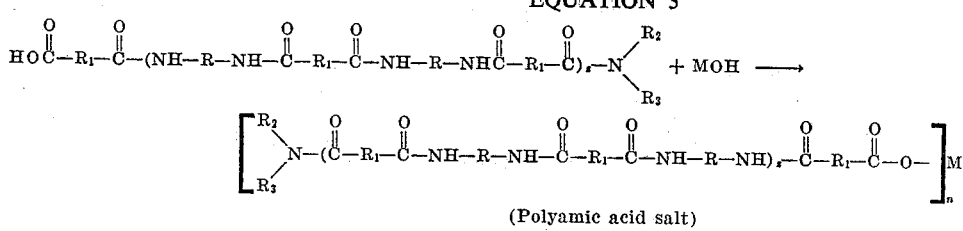

(Polyamic acid salt)

As stated hereinabove, less than stoichiometric amounts of amines are reacted with the polyamide dicarboxylic acids, leaving free carboxyl groups. Although the amount of amines used be sufficient to neutralize from 10% to 95% of the terminal carboxyl groups, it is preferred to use amines in amount sufficient to neutralize from 50% to 90% of the terminal carboxyl groups, leaving from 90% to 50% (10% to 50% preferred) carboxyl groups free for saponification by reaction with a metal oxide or hydroxide.

It is recognized that in the formation of the above polyamic acids and salts thereof that polyamido dicarboxylic acids and the salts thereof, i. e., $$HO\overset{O}{\overset{\|}{C}}-R_1-\overset{O}{\overset{\|}{C}}-(NH-R-NH-\overset{O}{\overset{\|}{C}}-R_1-\overset{O}{\overset{\|}{C}}-NH-R-NH-\overset{O}{\overset{\|}{C}}-R_1-\overset{O}{\overset{\|}{C}})_x-OH$$

and polyamides, i. e., $$\overset{R_2}{\underset{R_3}{\diagdown}}N-\overset{O}{\overset{\|}{C}}-R_1-\overset{O}{\overset{\|}{C}}-(NH-R-NH\overset{O}{\overset{\|}{C}}-R_1-\overset{O}{\overset{\|}{C}}-NH-R-NH-\overset{O}{\overset{\|}{C}}-R_1-\overset{O}{\overset{\|}{C}})_x-N\overset{\diagup R_2}{\underset{R_3}{\diagdown}}$$

are also found. It is preferred that the amount of polyamido dicarboxylic acids and salts thereof be kept at a minimum.

The polyamic acids of themselves can thicken lubricating oils to the consistency of greases. Thus, it is a further embodiment of this invention that the polyamic acids also be considered as grease-thickening agents.

In the above formulas R, $R_1$, and $R_2$ are saturated or unsaturated, straight-chained, branch-chained or cyclic, essentially hydrocarbonaceous groups, $R_3$ is hydrogen or a saturated or unsaturated, straight-chained, branch-chained or cyclic essentially hydrocarbonaceous group, $Y/x$ is the molar ratio of dibasic acid to diamine, which ratio has a value greater than 1 (i. e., from 1.05 to 5.0; preferably from 1.4 to 4), and M is a metal from groups I, II, III and IV of Mendeleef's Periodic Table, such as sodium, potassium, lithium, calcium, barium, zinc, aluminum, silver, lead, magnesium, etc.

The R and $R_1$ can be methylene groups, i. e., $(CH_2)_x$, wherein $x$ is a number, for the R group, from 2 to 30 (4 to 8 preferred), and for the $R_1$ group, from 1 to 52 (2 to 8 preferred) (including methylene groups which have one or more saturated or unsaturated, straight-chained, branch-chained or cyclic groups attached thereto); a phenyl group; a substituted phenyl group, wherein the phenyl nucleus contains one or more aliphatic groups attached thereto, etc.

The $R_2$ and $R_3$ groups (when $R_3$ is not hydrogen) can be aliphatic groups, alkaryl groups or aralkyl groups, each having from 2 to 50 carbon atoms, 4 to 20 carbon atoms being preferred.

Examples of R and $R_1$ groups include methylene, dimethylene, trimethylene, hexamethylene, octamethylene, octadecylmethylene, a benzene nucleus, a substituted benzene group (wherein the benzene nucleus has one or more aliphatic groups attached thereto), etc.; radicals derived from petroleum hydrocarbons, such as white oil, wax, olefin polymers, etc.

Examples of the $R_2$ and $R_3$ radicals (when $R_3$ is not hydrogen) include the following: ethyl, propyl, propenyl, butyl, pentyl, pentenyl, hexyl, octyl, octanyl, nonyl, decyl, decanyl, dodecyl, dodecenyl, tetradecyl tetradecenyl, hexadecyl, octadecyl, eicosyl, triacontyl, capryl, octadecenyl, radicals derived from petroleum hydrocarbons, such as white oil, wax, olefin polymers, e. g., polypropylene and polybutene, etc.

By "the essentially hydrocarbonaceous" radical, is meant those radicals which are composed mainly of hydrogen and carbon and include such radicals which include, in addition, minor amounts of the substituents such as chlorine, bromine, oxygen, nitrogen, etc.

As is well known in the art, it is characteristic of bifunctional reactants similar to the diamines and the dibasic acids herein that the possibility exists of producing polymers of infinite length. However, the maximum length of the diamine-dibasic acid polymer formed according to this invention is not as great as that obtained wherein the diamines and the dibasic acids are present in stoichiometric amounts. It is known that when the value of $Y/x$ in the above equation is 1, the resulting diamine-dibasic acid reaction products are not oil dispersible. However, when the value for $Y/x$ is less than 1, the resulting polymeric compounds are oil dispersible.

The values of $z$ in the above equation are not fixed values for any one reaction. It is understandable to those skilled in the art that, although $z$ is an integer, it varies considerably. For example, in the formation of thickening agents of this invention wherein adipic acid and hexamethylene diamine are the reactants and the value for $Y/x$ is less than 1, the value of $z$ can vary from zero to 10 or more for the individual reaction products formed. However, the "average" value for $z$ in such an example varies only from about 1.5 to about 4. In all probability, $z$ can vary from 0 to 20 or more.

Lubricating oils which are suitable base oils for the grease composition of this invention include a wide variety of lubricating oils, such as naphthenic base, paraffin base, and mixed base, other hydrocarbon lubricants, e. g., lubricating oils derived from coal products, and synthetic oils, e. g., alkylene polymers (such as polymers of propylene, butylene, etc., and mixtures thereof), alkylene oxide type polymers, dicarboxylic acid esters, liquid esters of acids of phosphorus, alkyl benzene polymers, polymers of silicon, etc. Synthetic oils of the alkylene oxide type polymers which may be used include those exemplified by the alkylene oxide polymers (e. g., propylene oxide polymers) and derivatives, including alkylene oxide polymers prepared by polymerizing the alkylene oxides, e. g., propylene oxide, in the presence of water or alcohols, e. g., ethyl alcohol; esters of ethylene oxide type polymers, e. g., acetylated propylene oxide polymers prepared by acetylating propylene oxide polymers containing hydroxyl groups; polyethers prepared from the alkylene glycols, e. g., ethylene glycol, etc.

The polymeric products prepared from the various alkylene oxides and alkylene glycols may be polyoxyalkylenediols or polyalkylene glycol derivatives; that is, the terminal hydroxy group can remain as such, or one or both of the terminal hydroxyl groups can be removed during the polymerization reaction by esterification or etherification.

Synthetic oils of the dicarboxylic acid ester type include those which are prepared by esterifying such dicarboxylic acids as adipic acid, azelaic acid, suberic acid, sebacic acid, alkenyl succinic acid, fumaric acid, maleic acid, etc., with alcohols such as butyl alcohol, hexyl alcohol, 2-ethylhexyl alcohol, dodecyl alcohol, etc. Examples of dicarboxylic acid ester synthetic oils include dibutyl adipate, dihexyl adipate, di-2-ethylhexyl sebacate, di-n-hexyl fumaric polymer.

Synthetic oils of the alkyl benzene type include those which are prepared by alkylating benzene (e. g., dodecyl benzene, tetradecyl benzene, etc.).

Synthetic oils of the type of liquid esters of acids of phosphorus include the esters of phosphoric acid, e. g., tricresyl phosphate; the esters of phosphonic acid, e. g., the diethyl ester of decanephosphonic acid, etc.

Synthetic oils of the type of polymers of silicon include the liquid esters of silicon and the polysiloxanes. The liquid esters of silicon and the polysiloxanes include those exemplified by tetraethylsilicate, tetraisopropyl silicate, tetra(methyl-2-butyl) silicate, tetra(4-methyl-2-pento) silicate, tetra(1-methoxy-2-propyl) silicate, hexyl-(4-methyl-2-pentoxy) disiloxane, poly(methylsiloxane), poly(methylphenylsiloxane), etc.

The above base oils may be used individually as such, or in various combinations, wherever miscible or wherever made so by the use of mutual solvents.

The grease thickening agents of this invention can be used in lubricating oils in amounts of from 6% to 50% by weight; however, from 10% to 30% are preferred. When it is desired merely to thicken lubricating oils to less than grease consistency, less than 6% may be used. For example, in the preparation of rust-proofing compositions or filter oils, less than 6% of the thickening agents of this invention may be incorporated in the lubricating oils.

Examples of the preparation of polyamic acid soaps of the present invention are presented as follows:

EXAMPLE 1

A mixture of 72.5 g. (0.5 mol) hexamethylene diamine (80% solution in water) and 146 g. (1 mol) of adipic acid was slowly heated with stirring. Water of reaction began to come from the reaction mixture at 240° F. 20 minutes later the temperature had reached 420° F., at which temperature the water of reaction ceased. To this reaction mixture 233 g. (0.75 mol) of Armeen HT was added dropwise at temperatures ranging from 390–430° F. over a period of 15 minutes. The reaction mixture was heated for an additional 5 minutes at 420–440° F. The cooled reaction product was a yellow-tan solid.

24 g. of the above reaction mixture (a tan solid) and 176 g. of a California solvent-refined naphthenic base oil having a viscosity of 450 SSU at 100° F. were heated, with stirring, to 450° F. This mixture was cooled to 200° F. and an aqueous solution of LiOH·H2O, heated to 450° F., then cooled to room temperature and milled through a 200-mesh screen. The resulting grease had a dropping point of 445° F., and an ASTM worked penetration of 223 (60 strokes).

EXAMPLE 2

A mixture of 308 g. (2.175 mols) of a 75% aqueous solution of hexamethylene diamine and 621 g. (4.25 mols) of adipic acid was heated, with stirring, to 400° F. The reaction mixture was kept at this temperature until the water of reaction had ceased. To this reaction mixture was added 1120 g. (3.825 mols) of Armeen HT. The temperature was maintained at 440–450° F. until all of the water of reaction had ceased. On cooling, the reaction product was a light yellow solid.

A mixture of 168 g. of the above reaction product and 1232 g. of a California solvent-refined base oil having a viscosity of 450 SSU at 100° F. was heated, with stirring, to 490° F. The reaction mixture was cooled to 200° F. and 1.5 grams of NaOH in 200 mols of water was added, then heated to 450° F., followed by cooling to room temperature, then milled through a 200-mesh screen. The resulting grease had a dropping point of 455° F. and an ASTM penetration of 264 (60 strokes), and was a clear, brown unctuous grease.

Table I hereinbelow presents further data on grease preparations of this invention. A 100 mol per cent excess of adipic acid was reacted with hexamethylene diamine. From 50% to 90% of the terminal carboxyl groups were then reacted with the noted amine, followed by reaction with the noted metal hydroxide to saponify the remaining carboxyl groups.

"$R_3$" in each thickener was hydrogen.

The base oil in each experiment was a California solvent-refined naphthenic base oil having a viscosity of 450 SSU at 100° F.

The abbreviations of Table I are defined as follows:

"HTD" is "Armeen HTD," a product of Armour & Company, Chicago, Illinois, containing 25% n-hexadecyl amine, 70% n-octadecyl amine and 5% n-octadecenyl amine.

"HT" is "Armeen HT," a similar composition to HTD, with the exception that 85% of the amines consist of n-primary amines.

"Percent Terminal Groups" means the per cent of the remaining carboxyl groups saponified by the metal.

Table I

| Exp. No. | "$R_2$" Group | Metal Cation | Percent Terminal Salt Group | Dropping Point (°F.) | ASTM Worked Penetration (60 Strokes) |
|---|---|---|---|---|---|
| 1 | HTD | Li | 50 | 454 | 271 |
| 2 | HT | Li | 25 | 436 | 269 |
| 3 | HT | Li | 10 | 462 | 229 |
| 4 | HT | Na | 25 | 455 | 237 |
| 5 | HT | Na | 10 | 466 | 264 |
| 6 | HT | Ca | 25 | 469 | 250 |
| 7 | HT | Ca | 10 | 453 | 302 |
| 8 | HT | H [1] | 10 | 468 | 238 |
| 9 | HTD | Na | 75 | 350 | 306 |

[1] The grease thickening agent in this instance was the polyamic acid, not the salt.

The data presented hereinbelow in Table II show (1) the effectiveness of the thickening agents of this invention in resisting oxidation, and (2) resistance to wear. The Norma Hoffman ASTM-D-942 Oxidation Stability Test measures the loss in oxygen pressure over a period of 100 hours and 500 hours. The Falex Test, which measures wear loss at several pressures (steel on steel), (during a period of 30 minutes), is described in "Journal of the Institute of Petroleum," vol. 32, April 1946.

The greases are the same as those of the corresponding experiments of above Table I.

Table II

| Grease No. | Falex Wear Test (Mg. Loss) | | | Norma Hoffman Test, Pressure Drop, p. s. i. | |
|---|---|---|---|---|---|
| | 125 Lbs. | 250 Lbs. | 500 Lbs. | 100 Hrs. | 200 Hrs. |
| 1 | | | | 6 | 9 |
| 3 | | | | 7 | 11 |
| 8 | | | | 6 | 10 |
| 5 | 0.3 | 2.1 | 6.5 | | |

The thickening agents herein remarkably resist oxidation and rusting action. Greases prepared therefrom are highly resistant to oxidation and rusting.

In addition to the grease thickening agents of this invention, the grease composition may include other agents which will further enhance resistance to oxidation, other extreme pressure characteristics, resistance to wear; agents which serve as color correctors, rust inhibitors, thickening agents, etc.

I claim:

1. A grease composition comprising a major proportion of a lubricating oil and, in an amount sufficient to thicken said lubricating oil to the consistency of a grease, a grease thickening agent selected from the group consisting of polyamic acids of the formula:

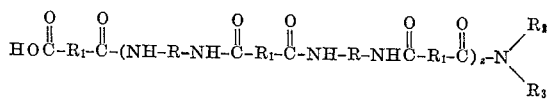

wherein R is a hexamethylene group, $R_1$ is a tetramethylene group, $R_2$ is a hydrocarbon group having from 16 to 18 carbon atoms, and $R_3$ is selected from the group consisting of hydrogen and hydrocarbon groups having from 16 to 18 carbon atoms, and z is a number having a value from 1.5 to 4, and the alkali metal salts of said polyamic acids, said hydrocarbon groups being selected from the group consisting of saturated and unsaturated, straight-chain, and branched-chain hydrocarbon radicals.

2. A grease composition comprising a lubricating oil and, in an amount sufficient to thicken said lubricating oil to the consistency of a grease, a grease thickening agent selected from the group consisting of polyamic acids of the formula:

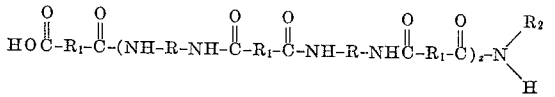

wherein R is a hexamethylene group, $R_1$ is a tetramethylene group, $R_2$ is a hydrocarbon group having from 16 to 18 carbon atoms, and z is a number having a value from 1.5 to 4, and the alkali metal salts of said polyamic acids, said hydrocarbon groups being selected from the group consisting of saturated and unsaturated, straight-chain, and branched-chain hydrocarbon radicals.

3. A grease composition comprising a lubricating oil and, in an amount sufficient to thicken said lubricating oil to the consistency of a grease, a grease thickening agent selected from the group consisting of polyamic acids of the formula:

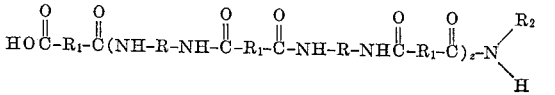

wherein R is a hexamethylene group, $R_1$ is a tetramethylene group, $R_2$ is an aliphatic group having from 16 to 18 carbon atoms, and $z$ is a number having a value from 1.5 to 4, and the lithium salts of said polyamic acids.

4. A grease composition comprising a lubricating oil and, in an amount sufficient to thicken said lubricating oil to the consistency of a grease, a grease thickening agent selected from the group consisting of polyamic acids of the formula:

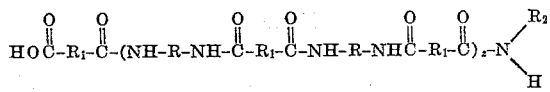

wherein R is a hexamethylene group, $R_1$ is a tetramethylene group, $R_2$ is an aliphatic group having from 16 to 18 carbon atoms, and $z$ is a number having a value from 1.5 to 4, and the sodium salts of said polyamic acids.

5. A grease composition comprising a lubricating oil and from 10% to 30% by weight of a grease thickening agent selected from the group consisting of polyamic acids of the formula:

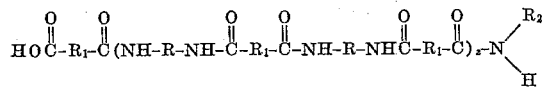

wherein R is a hexamethylene group, $R_1$ is a tetramethylene group, and $R_2$ is an aliphatic group containing from 16 to 18 carbon atoms, and $z$ is a number having a value from 1.5 to 4, and the alkali metal salts thereof.

6. A grease composition comprising a lubricating oil and from 10% to 30% by weight of a grease thickening agent selected from the group consisting of polyamic salts of the formula:

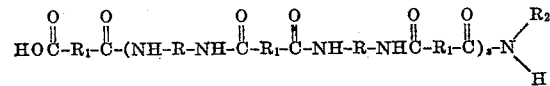

wherein R is a hexamethylene group, $R_1$ is a tetramethylene group, $R_2$ is an aliphatic group containing from 16 to 18 carbon atoms, and $z$ is a number having a value from 1.5 to 4, and the sodium salts thereof.

7. A grease composition comprising a lubricating oil and from 10% to 30% by weight of a grease thickening agent selected from the group consisting of polyamic acids of the formula:

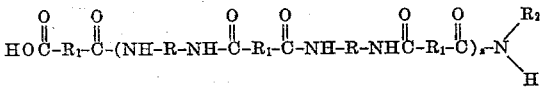

wherein R is a hexamethylene group, $R_1$ is a tetramethylene group, $R_2$ is an aliphatic group containing from 16 to 18 carbon atoms, and $z$ is a number having a value from 1.5 to 4, and the lithium salt of said polyamic acid.

References Cited in the file of this patent

UNITED STATES PATENTS

| Number | Name | Date |
|---|---|---|
| 1,937,463 | Nill | Nov. 8, 1933 |
| 2,174,527 | Peterson | Oct. 3, 1939 |
| 2,201,741 | Owens et al. | May 21, 1940 |
| 2,281,576 | Hanford | May 5, 1942 |
| 2,317,751 | Frolich et al. | Apr. 27, 1943 |
| 2,345,700 | Dreyfus | Apr. 4, 1944 |
| 2,455,961 | Walker | Dec. 14, 1948 |
| 2,594,286 | Bryant et al. | Apr. 29, 1952 |
| 2,604,449 | Bryant et al. | July 22, 1952 |
| 2,614,079 | Moore | Oct. 14, 1952 |
| 2,640,812 | Bryant | June 2, 1953 |